United States Patent
Kaneko et al.

(10) Patent No.: US 12,169,955 B2
(45) Date of Patent: Dec. 17, 2024

(54) GENERATING LEARNING DATA FROM IMPORTANT, CUT-OUT OBJECT REGIONS

(71) Applicant: NEC Corporation, Tokyo (JP)

(72) Inventors: Tomokazu Kaneko, Tokyo (JP); Katsuhiko Takahashi, Tokyo (JP); Makoto Terao, Tokyo (JP); Soma Shiraishi, Tokyo (JP); Takami Sato, Tokyo (JP); Yu Nabeto, Tokyo (JP); Ryosuke Sakai, Tokyo (JP)

(73) Assignee: NEC CORPORATION, Tokyo (JP)

(*) Notice: Subject to any disclaimer, the term of this patent is extended or adjusted under 35 U.S.C. 154(b) by 273 days.

(21) Appl. No.: 17/587,065

(22) Filed: Jan. 28, 2022

(65) Prior Publication Data
US 2022/0254136 A1    Aug. 11, 2022

(30) Foreign Application Priority Data
Feb. 10, 2021   (JP) .................... 2021-019543

(51) Int. Cl.
*G06V 10/20*    (2022.01)
*G06N 5/04*    (2023.01)
(Continued)

(52) U.S. Cl.
CPC ............. *G06V 10/255* (2022.01); *G06N 5/04* (2013.01); *G06T 7/70* (2017.01); *G06V 10/25* (2022.01);
(Continued)

(58) Field of Classification Search
CPC .......... G06T 2207/20081; G06N 20/00; G06N 5/04; G06V 10/255; G06V 10/25; G06V 10/70; G06V 20/46; G06V 40/10
See application file for complete search history.

(56) References Cited

U.S. PATENT DOCUMENTS

| 9,665,802 B2 * | 5/2017 | Wang .................. G06F 18/2414 |
| 2016/0140424 A1 * | 5/2016 | Wang .................. G06F 18/2414 |
| | | 382/156 |

(Continued)

FOREIGN PATENT DOCUMENTS

| CN | 110598609 A | * 12/2019 | ......... G06K 9/00671 |
| JP | 2013164834 A | * 8/2013 | ............. G06F 3/005 |

(Continued)

OTHER PUBLICATIONS

Gupta AK, Seal A, Prasad M, Khanna P. Salient Object Detection Techniques in Computer Vision—A Survey. Entropy (Basel). Oct. 19, 2020;22(10):1174. doi: 10.3390/e22101174. PMID: 33286942; PMCID: PMC7597345. (Year: 2020).*

(Continued)

*Primary Examiner* — Michael Robert Cammarata

(57) ABSTRACT

An image acquisition unit 110 acquires a plurality of images. The plurality of images include an object to be inferred. An image cut-out unit 120 cuts out an object region including the object from each of the plurality of images acquired by the image acquisition unit 110. An importance generation unit 130 generates importance information by processing the object region cut out by the image cut-out unit 120. The importance information indicates the importance of the object region when an object inference model is generated, and is generated for each object region, that is, for each image acquired by the image acquisition unit 110. A learning data generation unit 140 stores a plurality of object regions cut out by the image cut-out unit 120 and a plurality of pieces of importance information generated by the importance generation unit 130 in a learning data storage unit 150 as at least a part of the learning data.

11 Claims, 8 Drawing Sheets

(51) Int. Cl.
   *G06T 7/70*     (2017.01)
   *G06V 10/25*    (2022.01)
   *G06V 10/70*    (2022.01)
   *G06V 20/40*    (2022.01)
   *G06V 30/224*   (2022.01)
   *G06V 40/10*    (2022.01)

(52) U.S. Cl.
   CPC .............. *G06V 10/70* (2022.01); *G06V 20/46* (2022.01); *G06V 30/224* (2022.01); *G06V 40/10* (2022.01)

(56) References Cited

U.S. PATENT DOCUMENTS

| | | | |
|---|---|---|---|
| 2018/0039911 A1* | 2/2018 | Bezzubtseva | G06N 20/00 |
| 2020/0012893 A1* | 1/2020 | Shiraishi | G06V 20/10 |
| 2020/0137300 A1* | 4/2020 | Ogawa | G06V 10/10 |
| 2020/0151511 A1* | 5/2020 | Tsutsumi | G06F 18/2155 |
| 2020/0242345 A1* | 7/2020 | Huang | G06V 10/44 |
| 2020/0380289 A1* | 12/2020 | Jagadeesh | H04N 23/67 |
| 2020/0394434 A1* | 12/2020 | Rao | G06N 3/08 |
| 2021/0097354 A1* | 4/2021 | Amato | G06V 30/2504 |
| 2021/0256307 A1* | 8/2021 | Papli | G06V 20/46 |
| 2022/0101047 A1* | 3/2022 | Puri | G06T 5/30 |
| 2023/0004811 A1* | 1/2023 | Ishikawa | G06N 3/096 |
| 2023/0401813 A1* | 12/2023 | Cao | G06V 40/161 |
| 2024/0062048 A1* | 2/2024 | Sakai | G06N 20/00 |
| 2024/0062545 A1* | 2/2024 | Nabeto | G06V 20/44 |

FOREIGN PATENT DOCUMENTS

| | | | | |
|---|---|---|---|---|
| JP | 2019-029021 A | 2/2019 | | |
| WO | WO-2018083910 A1 * | 5/2018 | ............ | G06F 16/50 |
| WO | 2018/168515 A1 | 9/2018 | | |
| WO | WO-2021157067 A1 * | 8/2021 | .......... | G06N 3/0464 |
| WO | WO-2022127814 A1 * | 6/2022 | .......... | G06N 3/0454 |

OTHER PUBLICATIONS

Borji, A., Cheng, M. M., Hou, Q., Jiang, H., & Li, J. (2019). Salient object detection: A survey. Computational visual media, 5, 117-150} (Year: 2019).*

Wang, Wenguan, Jianbing Shen, and Ling Shao. "Video salient object detection via fully convolutional networks." IEEE Transactions on Image Processing 27.1 (2017): 38-49. (Year: 2017).*

M.-M. Cheng, N. J. Mitra, X. Huang, P. H. S. Torr and S.-M. Hu, "Global Contrast Based Salient Region Detection," in IEEE Transactions on Pattern Analysis and Machine Intelligence, vol. 37, No. 3, pp. 569-582, Mar. 1, 2015, doi: 10.1109/TPAMI.2014.2345401. (Year: 2015).*

X. Ding and Z. Chen, "Improving Saliency Detection Based on Modeling Photographer's Intention," in IEEE Transactions on Multimedia, vol. 21, No. 1, pp. 124-134, Jan. 2019, doi: 10.1109/TMM.2018.2851389. (Year: 2019).*

JP Office Action for JP Application No. 2021-019543, mailed on Oct. 22, 2024 with English Translation.

Katsumi Kikuchi et al., "Heterogeneous Object Recognition to Identify Retail Products", NEC Technical Journal, vol. 72, No. 1, Japan, Oct. 31, 2019, pp. 86-90.

* cited by examiner

GENERATING LEARNING DATA FROM IMPORTANT, CUT-OUT OBJECT REGIONS

This application is based on Japanese patent application NO. 2021-019543, the content of which is incorporated hereinto by reference.

BACKGROUND

Technical Field

The present invention relates to a data generation apparatus, a data generation method, and a program.

Related Art

In recent years, machine learning has been used in various fields. In order to generate a model by machine learning, learning data is required to be prepared. Japanese Patent Application Publication No. 2019-29021 describes, when applying machine learning for control of a robot used in a factory, preparing learning data using a following method. Specifically, object information of an object is first associated with a position and pose detection marker. Also, a learning data set generation jig is prepared. The learning data set generation jig includes a base part that serves as a guide for a placement position of an object and a marker being fixed above the base part. Then, in a state where the object arranged using the base part as a guide, a group of multi-viewpoint images of the whole object including the marker is acquired. Then, a bounding box for the object is set for the acquired group of images, and a captured image is associated with pose information and gravity center position information of the object being estimated from the captured image, the object information, and information related to the bounding box, and thereby a learning data set for performing object recognition of the object and estimation of a position and a pose thereof is generated.

SUMMARY

In order to improve an accuracy of a model generated by machine learning, it is necessary to prepare a large number of learning data. One example of an object of the present invention is to facilitate preparation of learning data that is used when generating a model for image recognition and has a high learning effect.

In one embodiment, there is provided a data generation apparatus that generates learning data for generating an object inference model that infers a type of an object included in an image, the data generation apparatus including:
  an image acquisition unit that acquires a plurality of images including the object;
  an image cut-out unit that cuts out an object region including an object from each of the plurality of images;
  an importance generation unit that generates, by processing each of the plurality of object regions, importance information indicating importance of the object region when an object inference model is generated; and
  a learning data generation unit that stores the plurality of object regions and a plurality of pieces of the importance information in a storage unit as at least a part of the learning data.

In another embodiment, there is provided a data generation method for generating learning data that is executed by a computer and generates an object inference model that infers a type of an object included in an image, the data generation method including:
  image acquisition processing for acquiring a plurality of images including the object;
  image cut-out processing for cutting out an object region including an object from each of the plurality of images;
  importance information generation processing for generating, by processing each of the plurality of object regions, importance information indicating importance of the object region when an object inference model is generated; and
  learning data generation processing for storing the plurality of object regions and a plurality of pieces of the importance information in a storage unit as at least a part of the learning data.

In still another embodiment, there is provided a program that causes a computer to function as a data generation apparatus that generates learning data for generating an object inference model that infers a type of an object included in an image, the program causing the computer to have:
  an image acquisition function for acquiring a plurality of images including the object;
  an image cut-out function for cutting out an object region including an object from each of the plurality of images;
  an importance information generation function for generating, by processing each of the plurality of object regions, importance information indicating importance of the object region when an object inference model is generated; and
  a learning data generation function for storing the plurality of object regions and a plurality of pieces of the importance information in a storage unit as at least a part of the learning data.

According to the present invention, preparation of learning data that is used when generating an image recognition model and has a high learning effect is facilitated.

BRIEF DESCRIPTION OF THE DRAWINGS

The above and other objects, advantages and features of the present invention will be more apparent from the following description of certain preferred example embodiments taken in conjunction with the accompanying drawings, in which.

DETAILED DESCRIPTION

Figure 1:
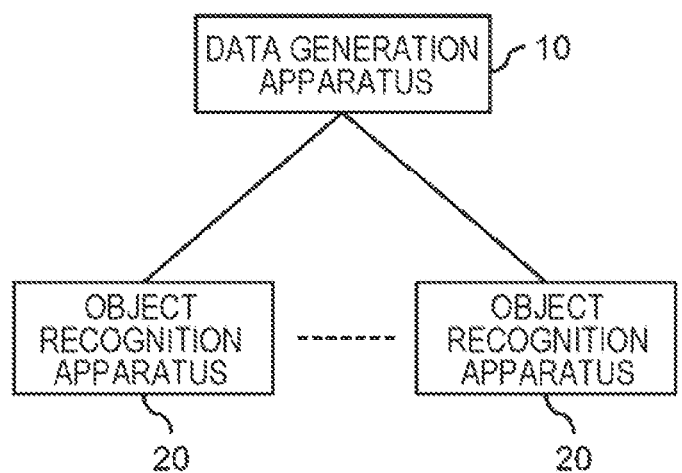
FIG. 1 is a drawing explaining a use environment of a data generation apparatus according to a first example embodiment.

The invention will be now described herein with reference to illustrative embodiments. Those skilled in the art will recognize that many alternative embodiments can be accomplished using the teachings of the present invention and that the invention is not limited to the example embodiments illustrated for explanatory purposes.

The following will describe example embodiments of the present invention with reference to the drawings. Note that, in all the drawings, like components are designated by like reference numerals, and description thereof will be omitted as appropriate.

First Example Embodiment

FIG. 1 is a drawing explaining a use environment of a data generation apparatus 10 according to the present example embodiment. The data generation apparatus 10 is used with an object recognition apparatus 20. The object recognition apparatus 20 infers (identifies) the type of an object included in an image by processing the image using an object inference model. The data generation apparatus 10 generates learning data for generating an object inference model. In the present example embodiment, the data generation apparatus 10 also generates an object inference model. Then, the data generation apparatus 10 transmits the generated object inference model to the object recognition apparatus 20. The data generation apparatus 10 may transmit the model to one object recognition apparatus 20, or may transmit the object inference model to a plurality of object recognition apparatuses 20.

The object recognition apparatus 20 is, for example, a product registration apparatus used at the time of settlement at a store. In this case, the object to be inferred is a product. Then, the object recognition apparatus 20 generates an image to be processed by taking an image of the product to be registered. Then, the object recognition apparatus 20 identifies the product by processing this image and registers the product as a product to be settled. Note that the object recognition apparatus 20 may be operated by a clerk or operated by a customer. Further, the object recognition apparatus 20 may or may not have a settlement function. In the latter case, the object recognition apparatus 20 is used with a checkout apparatus.

However, the object recognition apparatus 20 is not limited to the product registration apparatus.

Figure 2:
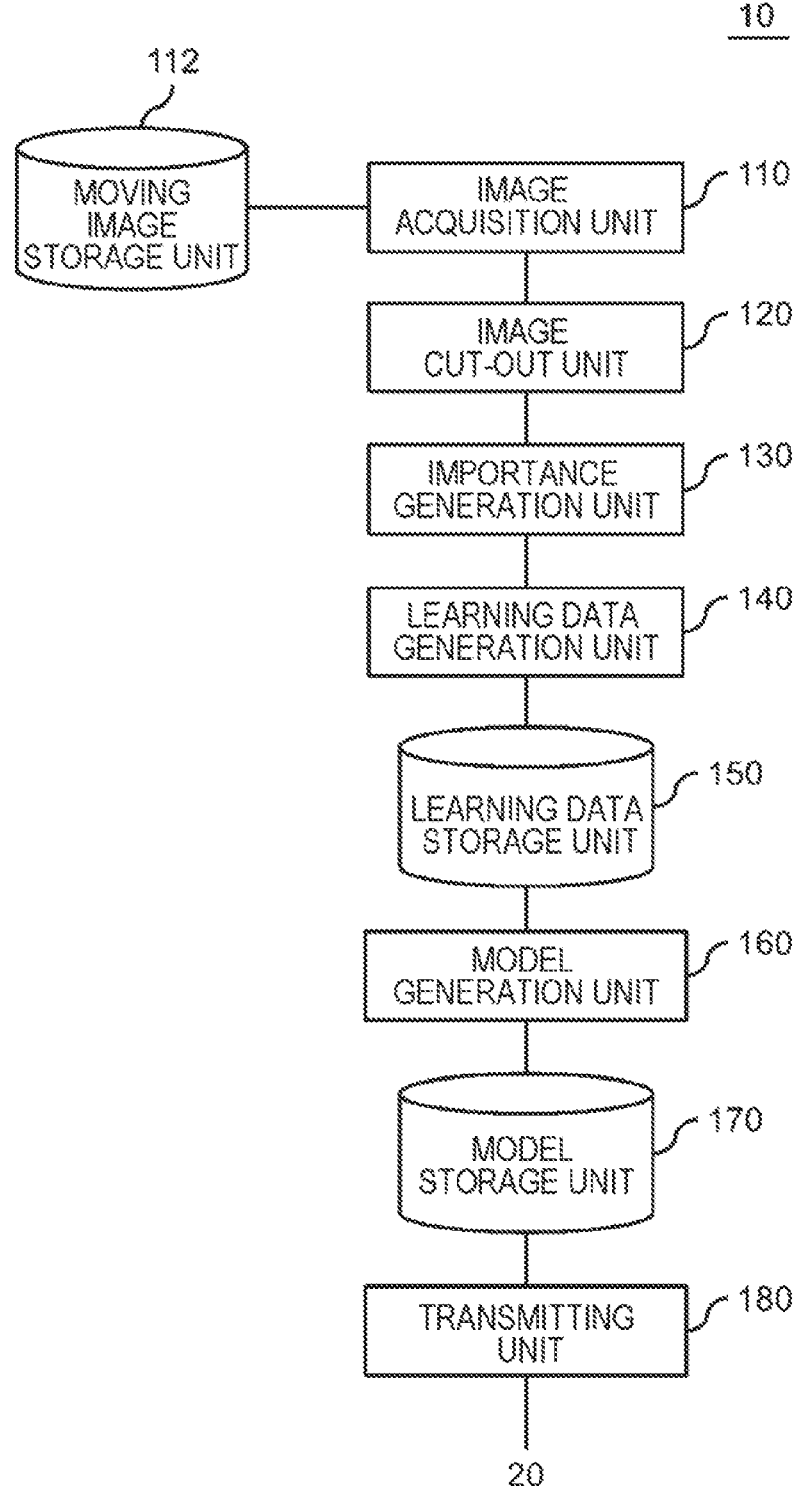
FIG. 2 is a drawing illustrating an example of the functional configuration of the data generation apparatus.

FIG. 2 is a drawing illustrating an example of the functional configuration of the data generation apparatus 10. The data generation apparatus 10 includes an image acquisition unit 110, an image cut-out unit 120, an importance generation unit 130, and a learning data generation unit 140.

The image acquisition unit 110 acquires a plurality of images. The plurality of images include an object to be inferred. In the example illustrated in FIG. 2, at least a part (or all) of the plurality of images are a plurality of frame images included in one moving image. This moving image is generated, for example, by shooting the image of the object while changing the relative orientation of the object to the imaging apparatus. In this way, each of the plurality of frame images included in one moving image becomes a still image in which the object is captured from a different direction from the others. As such, the object recognition model generated by the data generation apparatus 10 can infer the type of an object with accuracy even if the object is not facing a specific direction.

Note that, when generating a moving image, the moving image of the object may be shot while being held in a human hand. In this case, the orientation of the object is changed manually while the moving image is shot. On the other hand, the object may be stationary when generating a moving image. In this case, the relative orientation of the object to the imaging apparatus is changed by moving the imaging apparatus while the moving image is shot.

The image cut-out unit 120 cuts out an object region including the object from each of the plurality of images acquired by the image acquisition unit 110. An example of the shape of the object region is a rectangle. In the present example embodiment, the type of the object to be recognized is known in advance. Thus, the image cut-out unit 120 may determine and cut out the object region using the feature value of the object. Other examples of the processing performed by the image cut-out unit 120 will be described later using other drawings.

The importance generation unit 130 generates importance information by processing the object region cut out by the image cut-out unit 120. The importance information indicates importance of the object region when an object inference model is generated, and is generated for each object region, that is, for each image acquired by the image acquisition unit 110. The importance information includes, for example, a score indicating the importance.

As an example, the importance generation unit 130 generates importance information using sharpness of the object in the object region. The sharpness decreases as a blur and focus deviation (the lack of focus) at the time of capturing an image increase. Specifically, the importance generation unit 130 reduces the importance of the object region when the sharpness of the object is low. The sharpness can be calculated using, for example, an auto-focusing technology used in the imaging apparatus. Specifically, sharpness becomes high when in focus. Further, the image cut-out unit 120 may use the gradient of the pixel color information (for example, numerical values indicating the respective strengths of RGB) at the edge of the object as a value indicating sharpness. Then, the importance generation unit 130 determines that the sharpness is lower as this gradient becomes lower.

As another example, the importance generation unit 130 generates importance information using information related to a size of an object in the object region. For example, the importance generation unit 130 reduces the importance of the object region as the object in the object region becomes smaller. The importance generation unit 130 also reduces the importance of the object region when part of the object is hidden.

As another example, when an object is held in a human hand, the importance generation unit 130 generates importance information using information related to a size of the hand in the object region. This is because when the ratio of the hand that occupies the object region is large, the ratio of the object that occupies the object region is often low. Specifically, the importance generation unit 130 reduces the importance of the object region as the size of the hand in the object region increases.

The learning data generation unit 140 stores a plurality of object regions cut out by the image cut-out unit 120 and a plurality of pieces of importance information generated by the importance generation unit 130 in the learning data storage unit 150 as at least a part of the learning data. At this time, each of the plurality of object regions is linked to the importance information of the object region. In this learning data, the object region is used as at least a part of explanatory variables. Then, when learning an object region with a low importance, the learning data generation unit 140 reduces the influence (for example, contribution to loss) of the object region on an object recognition model. Note that an objective variable of this learning data is the type of the object (for example, the product name).

Note that the moving image storage unit 112 stores a moving image for each of a plurality of objects. Then, the image cut-out unit 120, the importance generation unit 130, and the learning data generation unit 140 perform the above-described processing for each object.

In the example illustrated in FIG. 2, the data generation apparatus 10 further includes a model generation unit 160, a model storage unit 170, and a transmitting unit 180. The model generation unit 160 generates an object inference model using the learning data stored in the learning data storage unit 150. Here, the model generation unit 160 generates a single object inference model using learning data generated for each object type. This object inference model outputs an inference result of object type when an image including an object is input. The model storage unit 170 stores the object inference model generated by the model generation unit 160. The transmitting unit 180 transmits the object inference model stored in the model storage unit 170 to the object recognition apparatus 20.

Note that, in the example illustrated in FIG. 2, the moving image storage unit 112, the learning data storage unit 150, and the model storage unit 170 are part of the data generation apparatus 10. However, at least one of these storage units may be provided outside of the data generation apparatus 10.

Further, the model generation unit 160, the model storage unit 170, and the transmitting unit 180 may be provided in an apparatus separate from the data generation apparatus 10.

Figure 3:
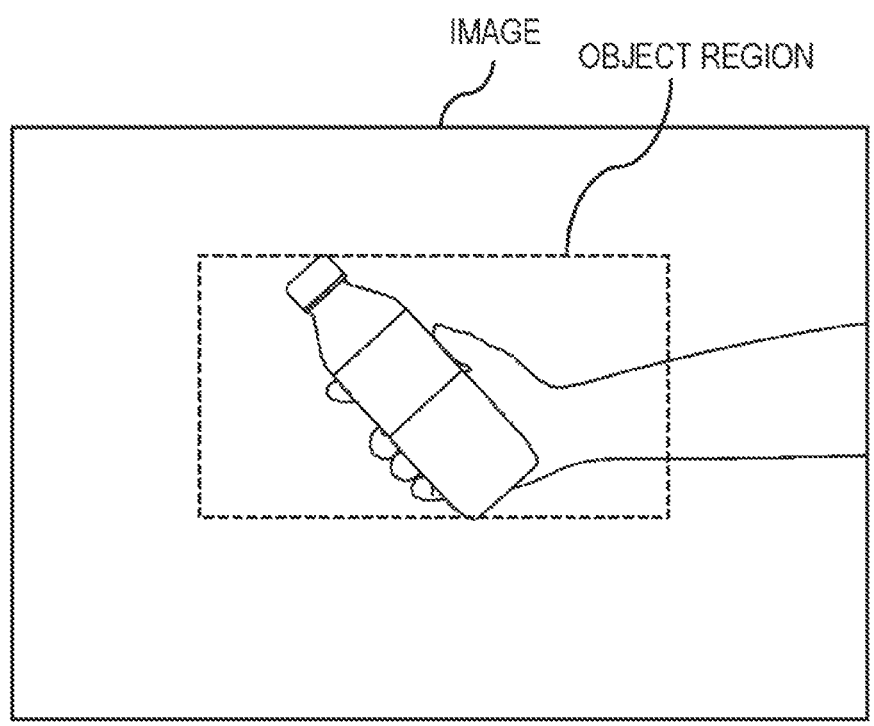
FIG. 3 is a drawing for explaining a first example of processing performed by an image cut-out unit.

FIG. 3 is a drawing for explaining an example of processing performed by the image cut-out unit 120. In the example illustrated in FIG. 3, an object is held in a hand. Then, the image cut-out unit 120 first determines the position of a human hand and determines an object region using this position of the hand. In this case, the image cut-out unit 120 determines the position of the hand, for example, using the feature value of the human hand, and detects a plurality of positions (object position candidates) where an object may exist, for example, using an object detection model. Then, the position closest to the position of the hand among the plurality of object position candidates is recognized as an object region.

Figure 4:
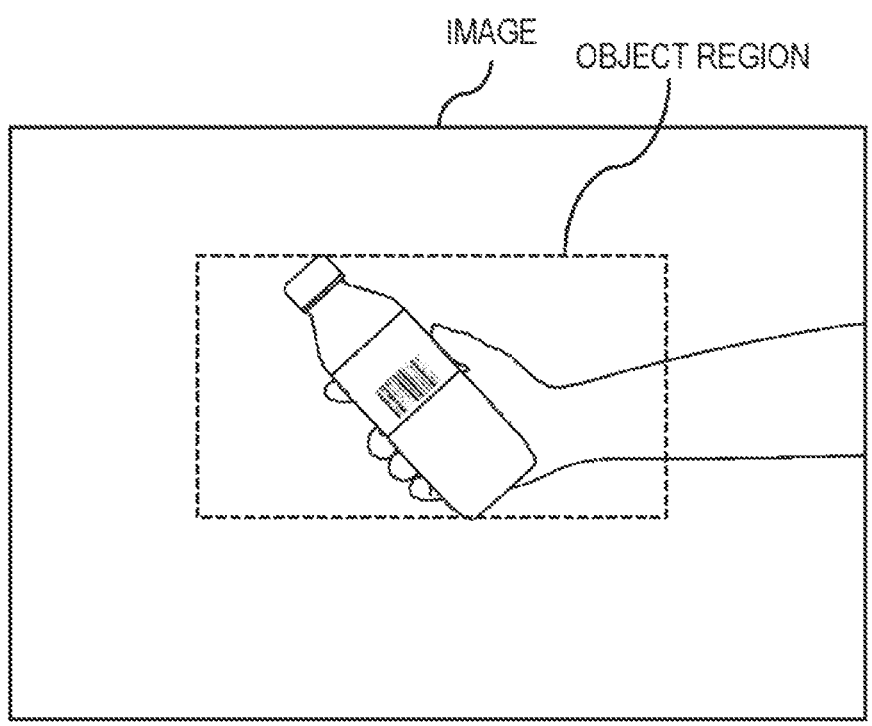
FIG. 4 is a drawing for explaining a second example of processing performed by the image cut-out unit.

FIG. 4 is a drawing for explaining another example of processing performed by the image cut-out unit 120. In the example illustrated in FIG. 4, a code such as a bar code or a two-dimensional code is given to an object. Then, the image cut-out unit 120 first determines the position of the code and determines an object region using the position of this code. Likewise, in this case, the image cut-out unit 120, for example, determines the position of the code using the feature value of the code, and determines an object containing this position using, for example, edge detection processing. Then, the area including this object is recognized as an object region.

Figure 5:
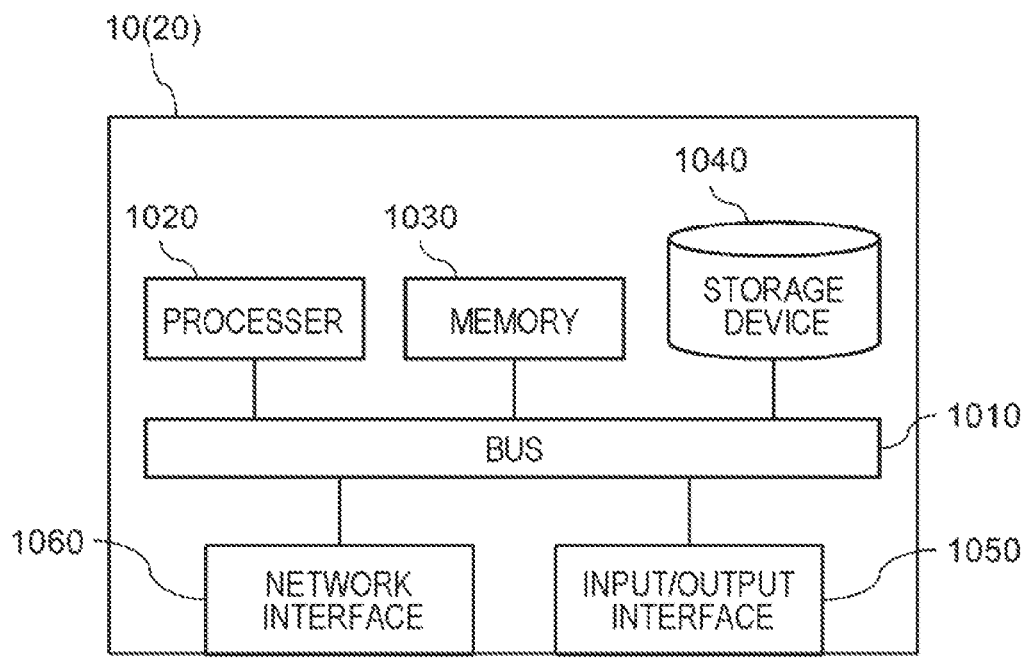
FIG. 5 is a drawing illustrating a hardware configuration example of the data generation apparatus.

FIG. 5 is a drawing illustrating a hardware configuration example of the data generation apparatus 10. The data generation apparatus 10 has a bus 1010, a processor 1020, a memory 1030, a storage device 1040, an input/output interface 1050, and a network interface 1060.

The bus 1010 is a data transmission path that allows the processor 1020, the memory 1030, the storage device 1040, the input/output interface 1050, and the network interface 1060 to transmit and receive data to and from one another. However, the method of connecting the processor 1020 and the like to one another is not limited to the bus connection.

The processor 1020 is a processor achieved by a central processing unit (CPU), a graphics processing unit (GPU), or the like.

The memory 1030 is a main storage achieved by random access memory (RAM) or the like.

The storage device 1040 is an auxiliary storage achieved by a hard disk drive (HDD), a solid state drive (SSD), a memory card, a read only memory (ROM), or the like. The storage device 1040 stores a program module that enables each function of the data generation apparatus 10 (for example, the image acquisition unit 110, the image cut-out unit 120, the importance generation unit 130, the learning data generation unit 140, the model generation unit 160, and the transmitting unit 180). The processor 1020 reads and executes each program module on the memory 1030 to enable each function corresponding to the program module. The storage device 1040 also functions as the moving image storage unit 112, the learning data storage unit 150, and the model storage unit 170.

The input/output interface 1050 is an interface for connecting the data generation apparatus 10 to various input/output equipment.

The network interface 1060 is an interface for connecting the data generation apparatus 10 to the network. This network is, for example, a local area network (LAN) or a wide area network (WAN). The method by which the network interface 1060 connects to the network may be a wireless connection or a wired connection. The data generation apparatus 10 may communicate with the object recognition apparatus 20 via the network interface 1060.

Figure 6:
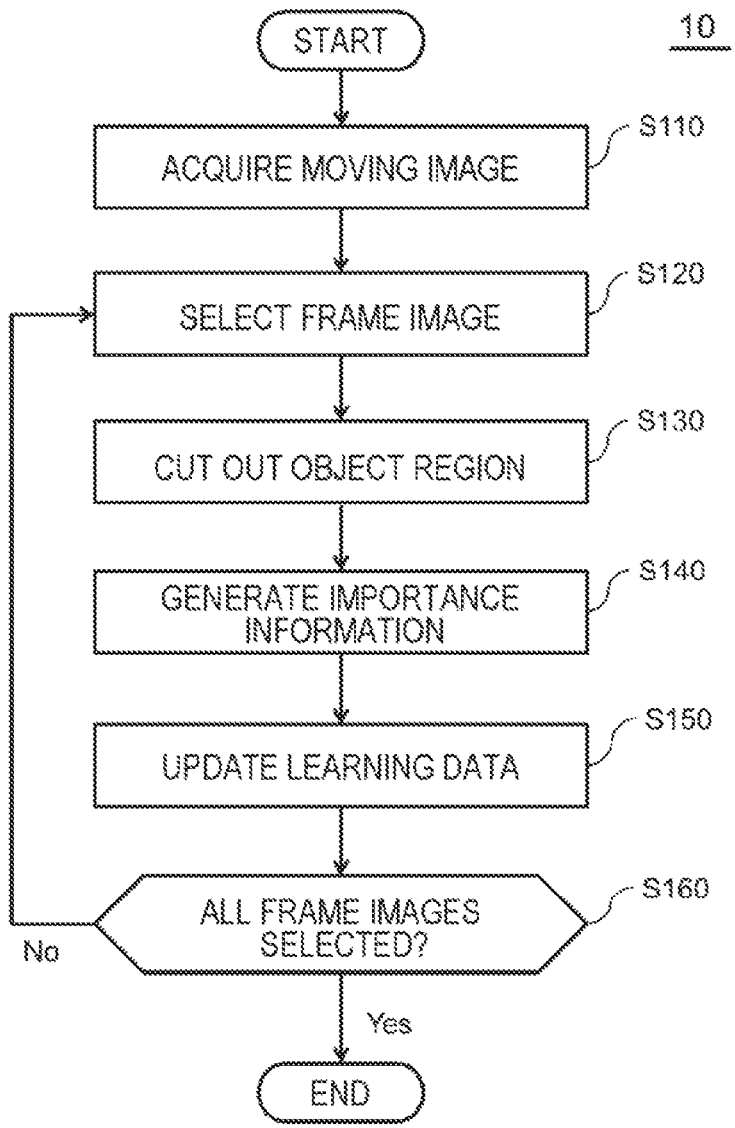
FIG. 6 is a flowchart illustrating an example of processing performed by the data generation apparatus.

FIG. 6 is a flowchart illustrating an example of processing performed by the data generation apparatus 10. The data generation apparatus 10 performs the processing illustrated in FIG. 6 for each type of object.

First, the image acquisition unit 110 of the data generation apparatus 10 acquires a moving image obtained by capturing an object to be processed (step S110). Then, the data generation apparatus 10 performs the processing illustrated in steps S120 to S150 for all of the plurality of frame images constituting the acquired moving image (step S160).

The image cut-out unit 120 first selects a frame image to be processed (step S120). Then, the image cut-out unit 120 cuts out an object region from the selected frame image (step S130). The details of this processing are as described with reference to FIGS. 2 to 4. Note that, although not illustrated, if the object is not captured in the selected frame image, the data generation apparatus 10 proceeds to step S160.

Next, the importance generation unit 130 generates importance information by processing the object region (step S140). The details of this processing are as described with reference to FIG. 2. Then, the learning data generation unit 140 updates the learning data by storing the object region and the importance information in the learning data storage unit 150 (step S150).

According to the present example embodiment, the learning data generated by the data generation apparatus 10 has an image including an object (an object region), as well as, importance data indicating the importance of the object region. In this way, even when the learning data generated by the data generation apparatus 10 includes an image that is not appropriate as learning data (for example, a blurry image), the effect of the image on the model is reduced. As such, even when an object recognition model is generated using the learning data generated by the data generation apparatus 10, the accuracy of the object recognition model is high. Therefore, learning data can be easily generated by using the data generation apparatus 10.

Second Example Embodiment

Figure 7:
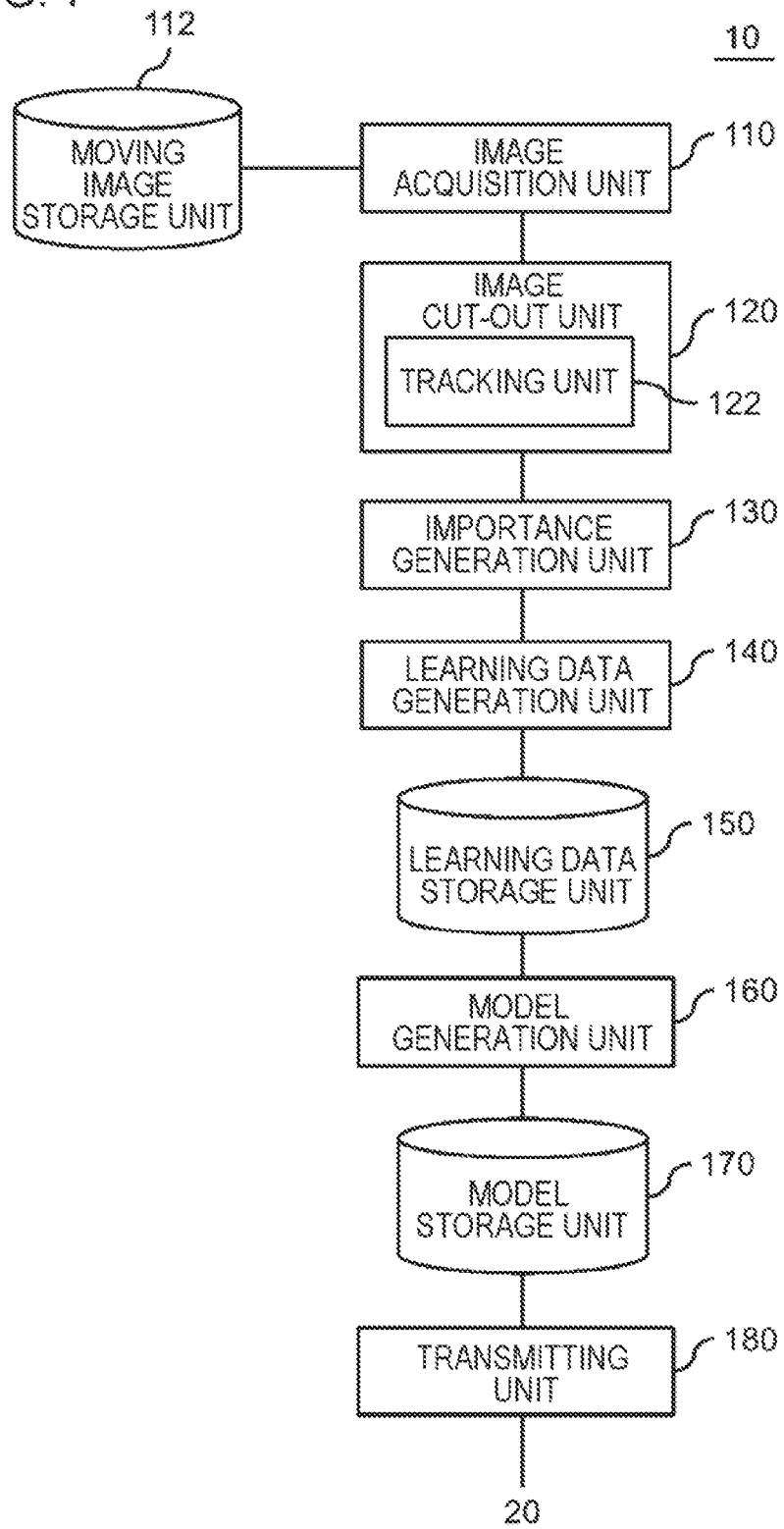
FIG. 7 is a drawing illustrating a functional configuration of a data generation apparatus according to a second example embodiment.

FIG. 7 is a drawing illustrating the functional configuration of a data generation apparatus 10 according to the present example embodiment, which corresponds to FIG. 2 of the first example embodiment. The data generation apparatus 10 illustrated in FIG. 7 is similar to the data generation apparatus 10 according to the first example embodiment, except that the image cut-out unit 120 has a tracking unit 122.

After the position of an object is determined in a certain frame image (hereinafter, referred to as the first frame image), the tracking unit 122 uses the position of the object in the first frame image when determining the position of the object in the following frame image (hereinafter, referred to as the second frame image). That is, the tracking unit 122 has a function of tracking an object in a moving image. As an example, the tracking unit 122 searches an object around an area near the position of the object in the first frame image. For example, the second frame image is the next frame image of the first frame image without limitation.

According to the present example embodiment, as in the first example embodiment, the learning data can be easily generated by using the data generation apparatus 10. Further, since the image cut-out unit 120 has the tracking unit 122, the object region can be easily cut out from the image.

Third Example Embodiment

Figure 8:
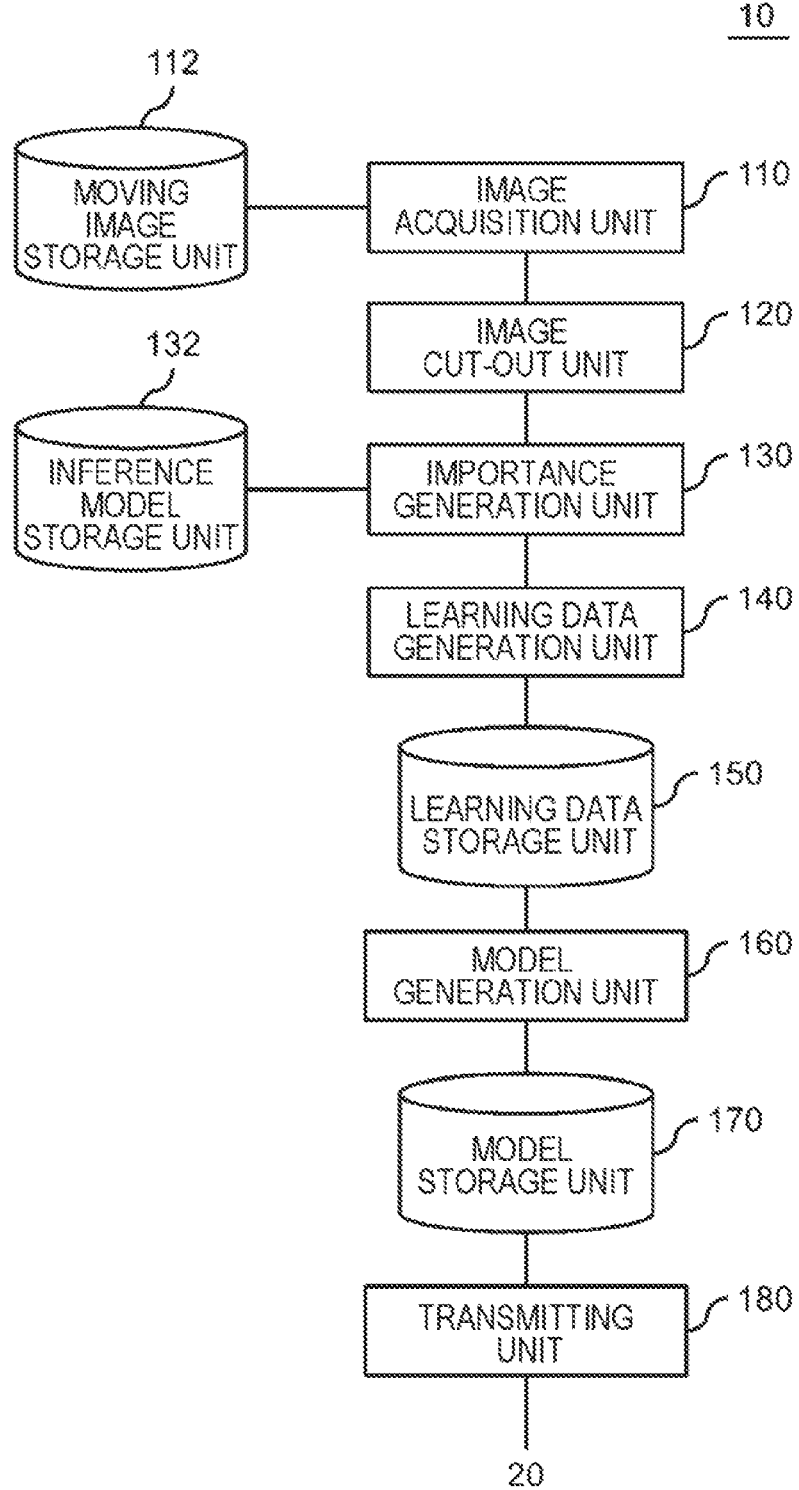
FIG. 8 is a drawing illustrating a functional configuration of a data generation apparatus according to a third example embodiment.

FIG. 8 is a drawing illustrating the functional configuration of a data generation apparatus 10 according to the present example embodiment, which corresponds to FIG. 2 of the first example embodiment. The data generation apparatus 10 illustrated in FIG. 8 is similar to the data generation apparatus 10 according to the first example embodiment, except for the following points.

The importance generation unit 130 generates importance information using a model for calculating importance (hereinafter, referred to as the importance inference model). The importance inference model outputs importance information when an object region is input. The importance inference model is stored, for example, in the inference model storage unit 132. The inference model storage unit 132 may be part of the data generation apparatus 10 or may be located outside of the data generation apparatus 10.

The importance inference model is generated, for example, as follows. First, learning data for an importance inference model is prepared. This learning data has an image corresponding to an object region as an explanatory variable and importance information as an object variable. To generate the learning data, importance information is input, for example, manually. Next, machine learning is performed using this learning data. In this way, an importance inference model is generated.

Note that, in the present example embodiment, the image cut-out unit 120 may also have the tracking unit 122 illustrated in the second example embodiment.

According to the present example embodiment, as in the first example embodiment, the learning data can be easily generated by using the data generation apparatus 10.

Although example embodiments of the present invention have been described with reference to the drawings, these are examples of the present invention, and various configurations other than the above can be adopted.

Further, although the plurality of steps (processes) are described in order in the plurality of flowcharts used in the above description, the execution order of the steps performed in each example embodiment is not limited to the described order. In each example embodiment, the order of the illustrated steps can be changed as long as the change does not interfere with the content. In addition, the above-described example embodiments can be combined as long as the contents do not conflict with each other.

Some or all of the above example embodiments may also be described as in the following supplementary notes, but are not limited to the following.

1. A data generation apparatus that generates learning data for generating an object inference model that infers a type of an object included in an image, the data generation apparatus including:
   an image acquisition unit that acquires a plurality of images including the object;
   an image cut-out unit that cuts out an object region including an object from each of the plurality of images;
   an importance generation unit that generates, by processing each of the plurality of object regions, importance information indicating importance of the object region when an object inference model is generated; and
   a learning data generation unit that stores the plurality of object regions and a plurality of pieces of the importance information in a storage unit as at least a part of the learning data.

2. The data generation apparatus according to the above 1, in which
   the image acquisition unit acquires a plurality of frame images included in one moving image as at least a part of the plurality of images.

3. The data generation apparatus according to the above 2, in which
   the image cut-out unit cuts out the object region from a second frame image of the frame images following a first frame image of the frame images using a position of the object region in the first frame image.

4. The data generation apparatus according to any one of the above 1 to 3, further including
   a model generation unit that generates the object inference model using the learning data.

5. The data generation apparatus according to any one of the above 1 to 4, in which
   the importance generation unit generates the importance information using sharpness of the object in the object region.

6. The data generation apparatus according to any one of the above 1 to 5, in which
   the importance generation unit generates the importance information using information related to the size of the object in the object region.

7. The data generation apparatus according to any one of the above 1 to 6, in which
   the object is held in a hand in the image, and
   the importance generation unit generates the importance information using information related to a size of the hand in the object region.

8. The data generation apparatus according to any one of the above 1 to 7, in which the importance generation unit generates the importance information using an importance inference model that outputs the importance information when the object region is input.

9. The data generation apparatus according to any one of the above 1 to 8, in which
the object is held in a hand, in the image, and
the image cut-out unit determines the object region using a position of the hand in the image.

10. The data generation apparatus according to any one of the above 1 to 9, in which
a surface of the object has a code, and
the image cut-out unit determines the object region using a position of the code in the image.

11. The data generation apparatus according to any one of the above 1 to 10, in which
the object is a product, and
the object inference model is used when a product registration apparatus recognizes a product to be registered.

12. A data generation method that is executed by a computer and generates learning data for generating an object inference model that infers a type of an object included in an image, the data generation method comprising:
image acquisition processing for acquiring a plurality of images including the object;
image cut-out processing for cutting out an object region including an object from each of the plurality of images;
importance information generation processing for generating, by processing each of the plurality of object regions, importance information indicating importance of the object region when an object inference model is generated; and
learning data generation processing for storing the plurality of object regions and a plurality of pieces of the importance information in a storage unit as at least a part of the learning data.

13. The data generation method according to the above 12, in which,
in the image acquisition processing, the computer acquires a plurality of frame images included in one moving image as at least a part of the plurality of images.

14. The data generation method according to the above 13, in which,
in the image cut-out processing, the computer cuts out the object region from a second frame image of the frame images following a first frame image of the frame images using a position of the object region in the first frame image.

15. The data generation method according to any one of the above 12 to 14, further including,
by the computer to execute,
model generation processing for generating the object inference model
using the learning data.

16. The data generation method according to any one of the above 12 to 15, in which,
in the importance generation processing, the computer generates the importance information using sharpness of the object in the object region.

17. The data generation method according to any one of the above 12 to 16, in which,
in the importance generation processing, the computer generates the importance information using information related to a size of the object in the object region.

18. The data generation method according to any one of the above 12 to 17, in which
the object is held in a hand, in the image, and,
in the importance generation processing, the computer generates the importance information using information related to a size of the hand in the object region.

19. The data generation method according to any one of the above 12 to 18, in which,
in the importance generation processing, the computer generates the importance information using an importance inference model that outputs the importance information when the object region is input.

20. The data generation method according to any one of the above 12 to 19, in which
the object is held in a hand, in the image, and,
in the image cut-out processing, the computer determines the object region using a position of the hand in the image.

21. The data generation method according to any one of the above 12 to 20, in which
a surface of the object has a code, and,
in the image cut-out processing, the computer determines the object region using a position of the code in the image.

22. The data generation method according to any one of the above 12 to 21, in which
the object is a product, and
the object inference model is used when a product registration apparatus recognizes a product to be registered.

23. A program that causes a computer to function as a data generation apparatus that generates learning data for generating an object inference model that infers a type of an object included in an image, the program causing the computer to have:
an image acquisition function for acquiring a plurality of images including the object;
an image cut-out function for cutting out an object region including the object from each of the plurality of images;
an importance information generation function for generating, by processing each of the plurality of object regions, importance information indicating importance of the object region when an object inference model is generated; and
a learning data generation function for storing the plurality of object regions and a plurality of pieces of the importance information in a storage unit as at least a part of the learning data.

24. The program according to the above 23, in which
the image acquisition function acquires a plurality of frame images included in one moving image as at least a part of the plurality of images.

25. The program according to the above 24, in which
the image cut-out function cuts out the object region from a second frame image of the frame images following a first frame image of the frame images using a position of the object region in the first frame image.

26. The program according to any one of the above 23 to 25, causing the computer to have
a model generation function for generating the object inference model using the learning data.

27. The program according to any one of the above 23 to 26, in which
the importance generation function generates the importance information using sharpness of the object in the object region.

28. The program according to any one of the above 23 to 27, in which
the importance generation function generates the importance information using information related to a size of the object in the object region.

29. The program according to any one of the above 23 to 28, in which
the object is held in a hand, in the image, and
the importance generation function generates the importance information using information related to a size of the hand in the object region.

30. The program according to any one of the above 23 to 29, in which
the importance generation function generates the importance information using an importance inference model that outputs the importance information when the object region is input.

31. The program according to any one of the above 23 to 30, in which
the object is held in a hand, in the image, and
the image cut-out function determines the object region using a position of the hand in the image.

32. The program according to any one of the above 23 to 31, in which
a surface of the object has a code, and
the image cut-out function determines the object region using a position of the code in the image.

33. The program according to any one of the above 23 to 32, in which
the object is a product, and
the object inference model is used when a product registration apparatus recognizes a product to be registered.

It is apparent that the present invention is not limited to the above example embodiments, and may be modified and changed without departing from the scope and spirit of the invention.

REFERENCE SIGNS LIST

10 Data generation apparatus
20 Object recognition apparatus
110 Image acquisition unit
120 Image cut-out unit
122 Tracking unit
130 Importance generation unit
132 Inference model storage unit
140 Learning data generation unit
150 Learning data storage unit
160 Model generation unit
170 Model storage unit
180 Transmitting unit

What is claimed is:

1. A data generation apparatus that generates learning data for generating an object inference model that infers a type of an object included in a plurality of images, the data generation apparatus comprising:
one or more memory storing instructions; and
one or more processors configured to execute the instructions to:
acquire the plurality of images including the object, the object held in a hand in the plurality of images;
cut out an object region including the object from each of the plurality of images;
generate, by processing the object region cut out from each of the plurality of images, importance information indicating importance of the object region when an object inference model is generated, using information related to a size of the hand in the object region; and
store the object region cut out from each of the plurality of images and the importance information generated by processing the object region cut out from each of the plurality of images.

2. The data generation apparatus according to claim 1, wherein
the one or more processors are further configured to execute the instructions to acquire a plurality of frame images included in one moving image as at least a part of the plurality of images.

3. The data generation apparatus according to claim 2, wherein
the one or more processors are further configured to execute the instructions to cut out the object region from a second frame image of the frame images following a first frame image of the frame images using a position of the object region in the first frame image.

4. The data generation apparatus according to claim 1, wherein
the one or more processors are further configured to execute the instructions to generate the object inference model using the learning data.

5. The data generation apparatus according to claim 1, wherein
the one or more processors are further configured to execute the instructions to generate the importance information using sharpness of the object in the object region.

6. The data generation apparatus according to claim 1, wherein
the one or more processors are further configured to execute the instruction to generate the importance information using information related to a size of the object in the object region.

7. The data generation apparatus according to claim 1, wherein
the one or more processors are further configured to execute the instructions to generate the importance information using an importance inference model that outputs the importance information when the object region is input.

8. A data generation apparatus that generates learning data for generating an object inference model that infers a type of an object included in a plurality of images, the data generation apparatus comprising:
one or more memory storing instructions; and
one or more processors configured to execute the instructions to:
acquire the plurality of images including the object, the object held in a hand in the plurality of images;
cut out an object region including the object from each of the plurality of images;
generate, by processing the object region cut out from each of the plurality of object images, importance information indicating importance of the object region when an object inference model is generated, using a position of the hand in the image; and
store the object region cut out from each of the plurality of images and the importance information generated by processing the object region cut out from each of the plurality of images, as at least a part of the learning data.

9. The data generation apparatus according to claim 1, wherein
a surface of the object has a code, and the one or more processors are further configured to execute the instructions to determine the object region using a position of the code in the image.

10. The data generation apparatus according to claim 1, wherein
the object is a product, and
the object inference model is used when a product registration apparatus recognizes a product to be registered.

11. A data generation method that is executed by a computer and generates learning data for generating an object inference model that infers a type of an object included in a plurality of images, the data generation method comprising:
acquiring the plurality of images including the object, the object is held in a hand in the plurality of images;
cutting out an object region including the object from each of the plurality of images;
generating, by processing the object region cut out from each of the plurality of images, importance information indicating importance of the object region when an object inference model is generated, using information related to a size of the hand in the object region; and
storing the object region cut out from each of the plurality of images and the importance information generated by processing the object region cut out from each of the plurality of images, as at least a part of the learning data.

* * * * *